(12) United States Patent
Yang

(10) Patent No.: US 9,664,109 B2
(45) Date of Patent: May 30, 2017

(54) METHOD FOR AUTO-ADDING ENERGY-SAVING ACTIVATOR AND APPARATUS FOR THE SAME

(71) Applicant: Gather Forward Technology LTD., Kaohsiung (TW)

(72) Inventor: Hsin-Huang Yang, Kaohsiung (TW)

(73) Assignee: GATHER FORWARD TECHNOLOGY LTD., Kaohsiung (TW)

( * ) Notice: Subject to any disclaimer, the term of this patent is extended or adjusted under 35 U.S.C. 154(b) by 295 days.

(21) Appl. No.: 14/505,833

(22) Filed: Oct. 3, 2014

(65) Prior Publication Data
US 2015/0144086 A1  May 28, 2015

(30) Foreign Application Priority Data

Nov. 22, 2013 (TW) .............................. 102221833 U
Jan. 8, 2014 (TW) .............................. 103100566 A
Mar. 17, 2014 (TW) .............................. 103204527 U

(51) Int. Cl.
*B08B 7/00* (2006.01)
*F02B 43/00* (2006.01)
(Continued)

(52) U.S. Cl.
CPC .............. *F02B 77/04* (2013.01); *F02B 47/06* (2013.01); *F02M 27/08* (2013.01);
(Continued)

(58) Field of Classification Search
CPC .. F02B 77/04; F02B 47/06; F17C 9/02; F02D 41/22; F02D 2200/025; F02D 41/003;
(Continued)

(56) References Cited

U.S. PATENT DOCUMENTS 3,510,006 A * 5/1970 Cheysson ............ A01K 1/0606
210/522
5,479,341 A * 12/1995 Pihl ..................... G11B 33/1406
340/542

(Continued)

*Primary Examiner* — Carlos A Rivera
*Assistant Examiner* — Syed O Hasan
(74) *Attorney, Agent, or Firm* — Birch, Stewart, Kolasch & Birch, LLP

(57) ABSTRACT

An apparatus to auto-adding an energy-saving activator has a container and a control unit. The container has a heater electrically connected to a control circuit of the control unit. The control unit has a vibration sensor and a sound sensor. When both the vibration and sound sensors transmit signals, the control circuit will actuate the heater to heat the energy-saving activator in the container so that the heated energy-saving activator turns into vapor and leaks out of the container toward the internal combustion engine to decrease the carbon deposits. Using both the vibration and sound sensors is in order to actuate the heater correctly without erroneous judgment. The heated vapor drafts into the internal combustion engine at once to mix with the fuel so that the fuel is burned oxyfuelly and completely to efficiently decrease the carbon deposits. Therefore, the efficiency of the internal combustion engine is also enhanced.

8 Claims, 6 Drawing Sheets

(51) Int. Cl.
  *B08B 9/00*    (2006.01)
  *F02B 77/04*    (2006.01)
  *F02B 47/06*    (2006.01)
  *F02M 27/08*    (2006.01)
  *F02M 31/125*   (2006.01)
  *F02D 41/22*    (2006.01)
  *F02D 41/00*    (2006.01)

(52) U.S. Cl.
  CPC ......... *F02M 31/125* (2013.01); *F02D 41/003* (2013.01); *F02D 41/22* (2013.01); *F02D 2200/025* (2013.01); *Y02T 10/126* (2013.01)

(58) Field of Classification Search
  CPC .. F02M 21/0221; F02M 27/08; F02M 31/125; C10L 10/06; C10G 9/16
  USPC .......................... 123/1 A, 557; 134/22.1, 20
  See application file for complete search history.

(56) References Cited

U.S. PATENT DOCUMENTS

2006/0112906 A1*  6/2006  Cunningham ......... F02M 25/00
                 123/1 A
2008/0283098 A1* 11/2008  Ogasawara ............ F02M 25/00
                 134/22.1

* cited by examiner

US 9,664,109 B2

METHOD FOR AUTO-ADDING ENERGY-SAVING ACTIVATOR AND APPARATUS FOR THE SAME

CROSS-REFERENCE TO RELATED APPLICATIONS

This application is based upon and claims priorities under 35 U.S.C. 119 from Taiwan Patent Application No. 102221833 filed on Nov. 22, 2013, Taiwan Patent Application No. 103100566 filed on Jan. 8, 2014 and Taiwan Patent Application No. 103204527 filed on Mar. 17, 2014, which are hereby specifically incorporated herein by this reference thereto.

BACKGROUND OF THE INVENTION

1. Field of the Invention

The present invention relates to automatic method and apparatus, especially to a method and an apparatus for auto-adding energy-saving activator.

2. Description of the Prior Arts

Internal combustion engines are widely used in the industry and daily life, such as boilers, vehicle engines and so on. Different internal combustion engines use different compounds with different ratios of hydrocarbon as fuels such as gas, heavy oil, diesel fuel, gasoline, coal oil and so on. When those fuels are burned in the internal combustion engines, different amount of carbon deposits are left in the internal combustion engines due to the ratios of the fuel and air or other reasons. Although the carbon deposits can be removed by rinsing the internal combustion engines regularly, the carbon deposits still cannot be eliminated at once. The carbon deposits are accumulated in the internal combustion engines for at least a while before being rinsed out so that the accumulated carbon deposits still affect the efficiency of the internal combustion engines. The users need to use more fuels to have the desired energy output to increase the cost for the fuels. Moreover, the carbon deposits also affect the burning efficiency of the internal combustion engines so that the incomplete combustion easily occurs and then harmful objects may be discharged to pollute the environment.

To overcome the shortcomings, the present invention provides a method and an apparatus to auto-adding an energy-saving activator to mitigate or obviate the aforementioned problems.

SUMMARY OF THE INVENTION

The main objective of the present invention is to provide a method and an apparatus to auto-adding an energy-saving activator. The apparatus has a container and a control unit. The container has a heater electrically connected to a control circuit of the control unit. The control unit has a vibration sensor and a sound sensor. When both the vibration and sound sensors transmit signals, the control circuit will actuate the heater to heat the energy-saving activator in the container so that the heated energy-saving activator turns into vapor and leaks out of the container toward the internal combustion engine to decrease the carbon deposits. Using both the vibration and sound sensors is in order to actuate the heater correctly without erroneous judgment. The heated vapor drafts into the internal combustion engine at once to mix with the fuel so that the fuel is burned oxyfuelly and completely to efficiently decrease the carbon deposits. Therefore, the efficiency of the internal combustion engine is enhanced without using more fuels. Moreover, the incomplete combustion is also reduced to avoid harmful objects.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
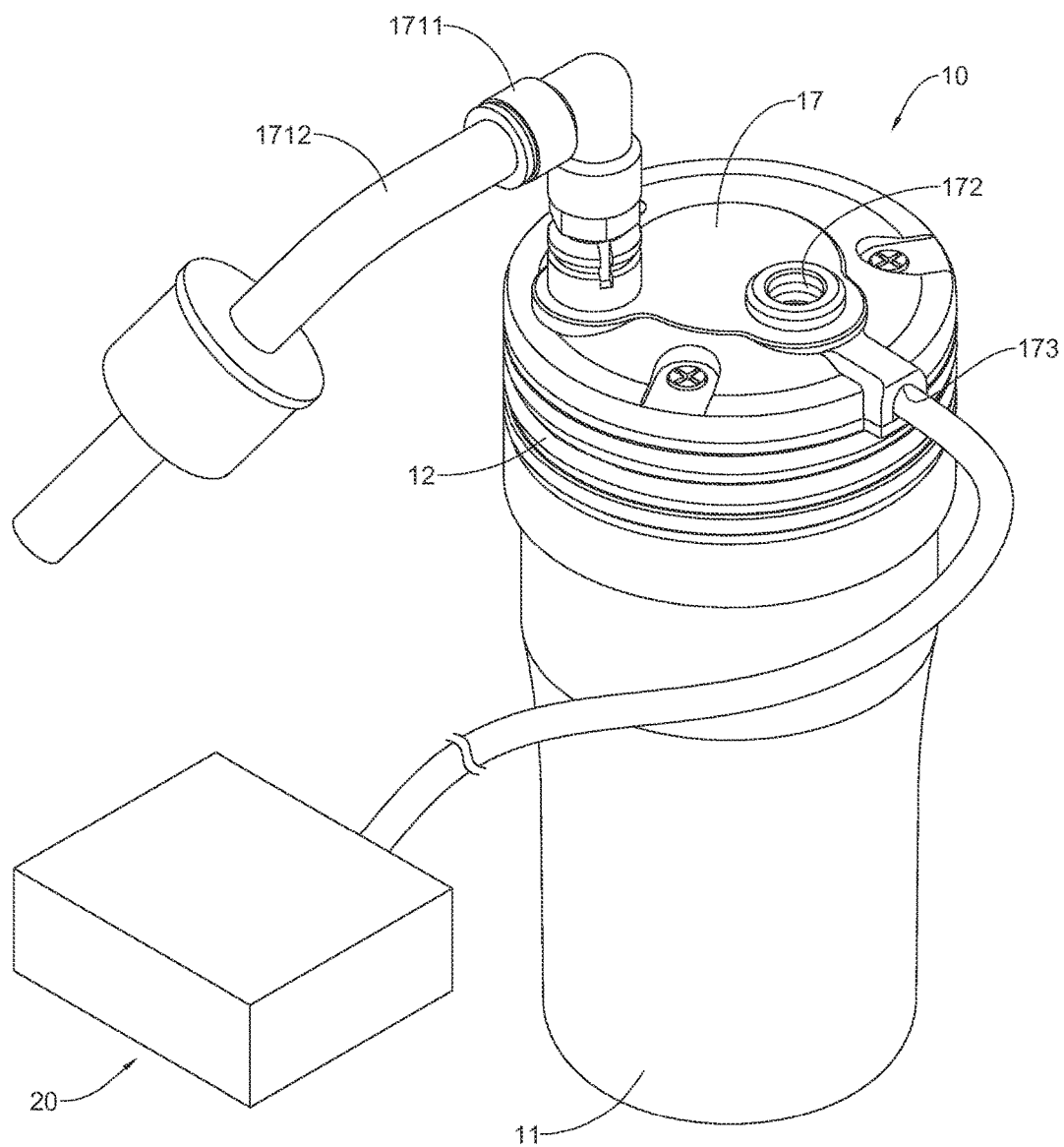
FIG. 1 is a perspective view of an apparatus for auto-adding an energy-saving activator in accordance with the present invention.

With reference to FIG. 1, an apparatus for auto-adding an energy-saving activator in accordance with the present invention comprises a container 10 and a control unit 20.

Figure 2:
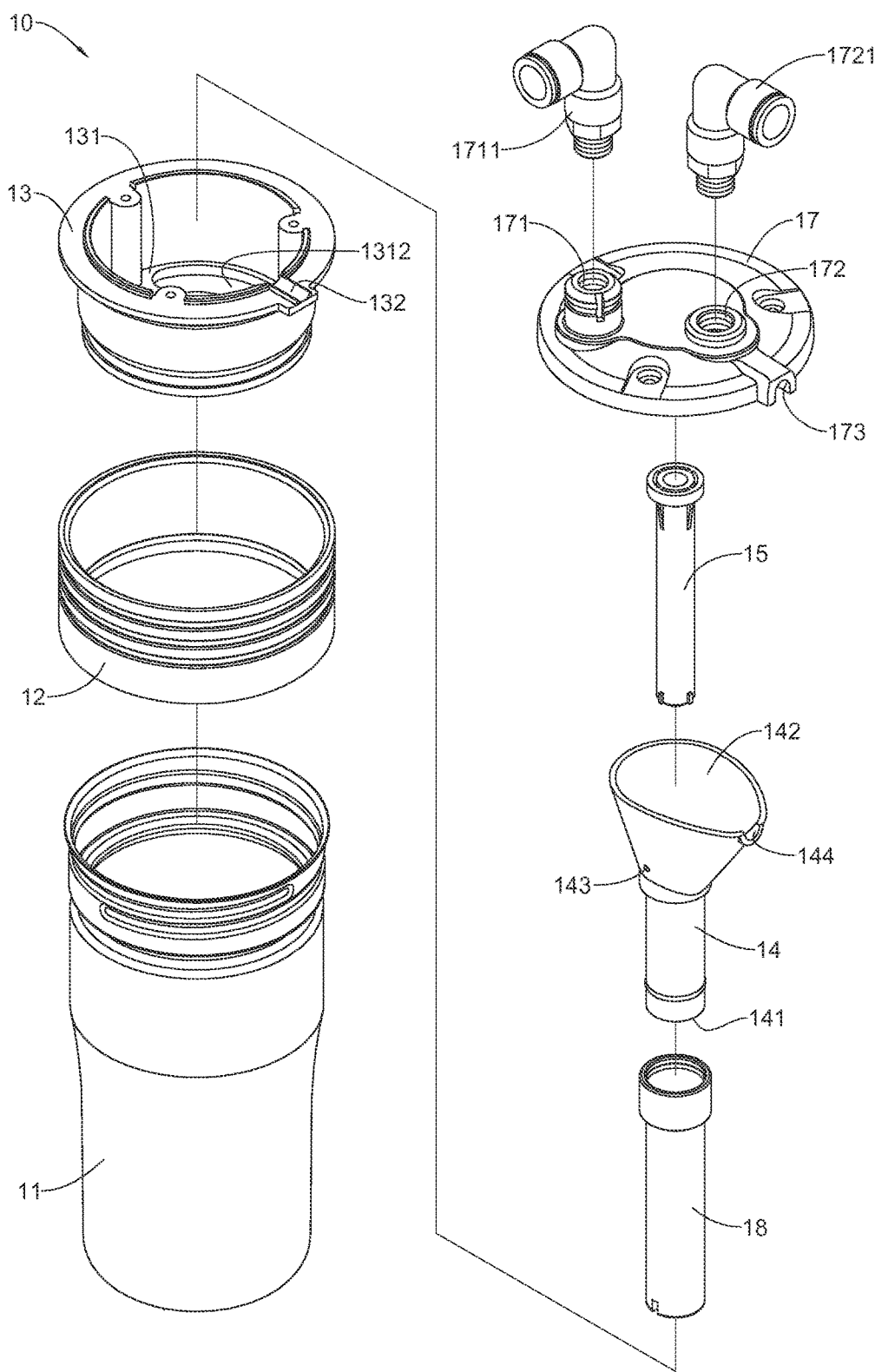
FIG. 2 is an exploded perspective view of the container of the apparatus in FIG. 1.
Figure 3:
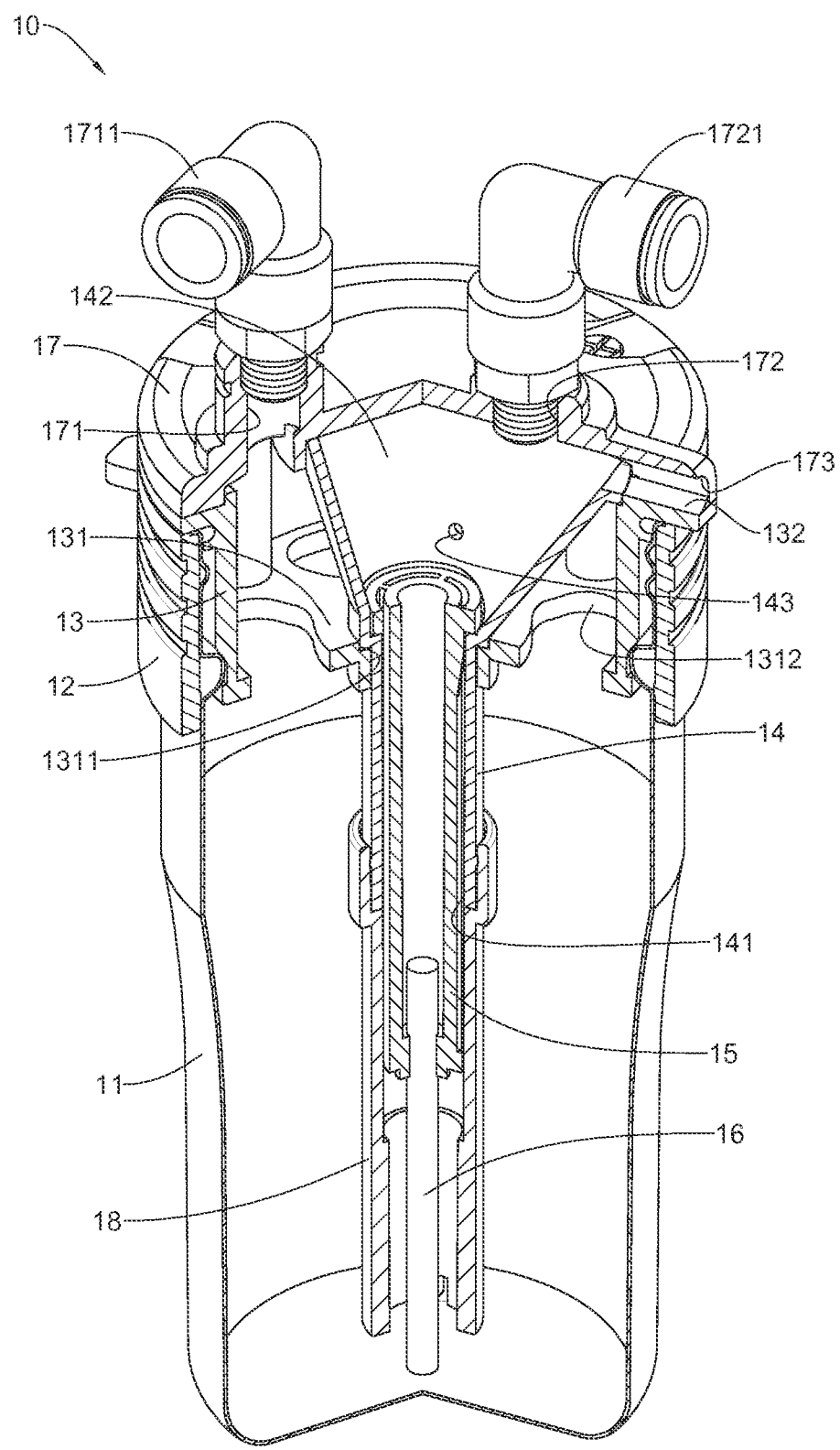
FIG. 3 is a cross sectional perspective view of the container of the apparatus in FIG. 1.

With reference to FIGS. 2 and 3, the container 10 comprises a main body 11, an outer sleeve 12, an inner sleeve 13, a funnel 14, a tube 15, a heater 16, a lid 17 and a supporting tube 18.

The main body 11 is hollow to contain the energy-saving activator and has a top opening. The outer sleeve 12 is mounted around and may be screwed around the main body 11 near the top opening.

The inner sleeve 13 is plugged into the top opening of the main body 11 and has a bottom wall 131 and a side tube 132. The bottom wall 131 has a central hole 1311 and multiple side holes 1312. The side tube 132 is formed on an outside wall of the inner sleeve 13 and extends out of the top opening of the main body 11.

The funnel 14 is mounted through the central hole 1311 of the inner sleeve 13 and is mounted in the main body 11. The funnel 14 has a bottom opening 141, a top opening 142, at least one side orifice 143 and a side opening 144. The top opening 142 of the funnel 14 is mounted above the top opening of the main body 11. A top part of the funnel 14 is wider than a bottom part of the funnel 14 to receive much vapor to make sure that the vapor in the funnel 14 is enough to supply to the internal combustion engine. The side orifice 143 is formed near the top opening 142 of the funnel 14 and is formed above the bottom wall 131 of the inner sleeve 13. The side opening 144 is formed adjacent to the top opening 142 of the funnel 14 and aligns with and communicates with the side tube 132 of the inner sleeve 13.

The tube 15 is mounted in the funnel 14. The heater 16 is mounted in the main body 11 to heat the energy-saving activator and may be mounted in the funnel 14 and be held by the tube 15 and protrudes through the bottom opening 141 of the funnel 14. The heater 16 may be made of ceramics to have better heating efficiency.

The lid 17 is covered on the top opening of the main body 11 and the top opening 142 of the funnel 14. The lid 17 has an activator filling hole 171, a vapor leaking hole 172 and a side passage 173. The activator filling hole 171 communicates with the top opening of the main body 11 and may have a connector 1711 detachably mounted on the activator filling hole 171. The connector 1711 may be connected to a filter 1712. When the energy-saving activator is added into the container 10, the connector 1711 and the filter 1712 are removed. After the energy-saving activator is added, the connector 1711 and the filter 1712 are mounted on the activator filling hole 171 in sequence. The vapor leaking hole 172 communicates with the top opening 142 of the funnel 14 and may have a connector 1721 detachably mounted on the vapor leaking hole. The side passage 173 is formed through a sidewall of the lid 17 and aligns with and communicates with the side tube 132 of the inner sleeve 13.

The supporting tube is mounted around the funnel 14.

Figure 4:
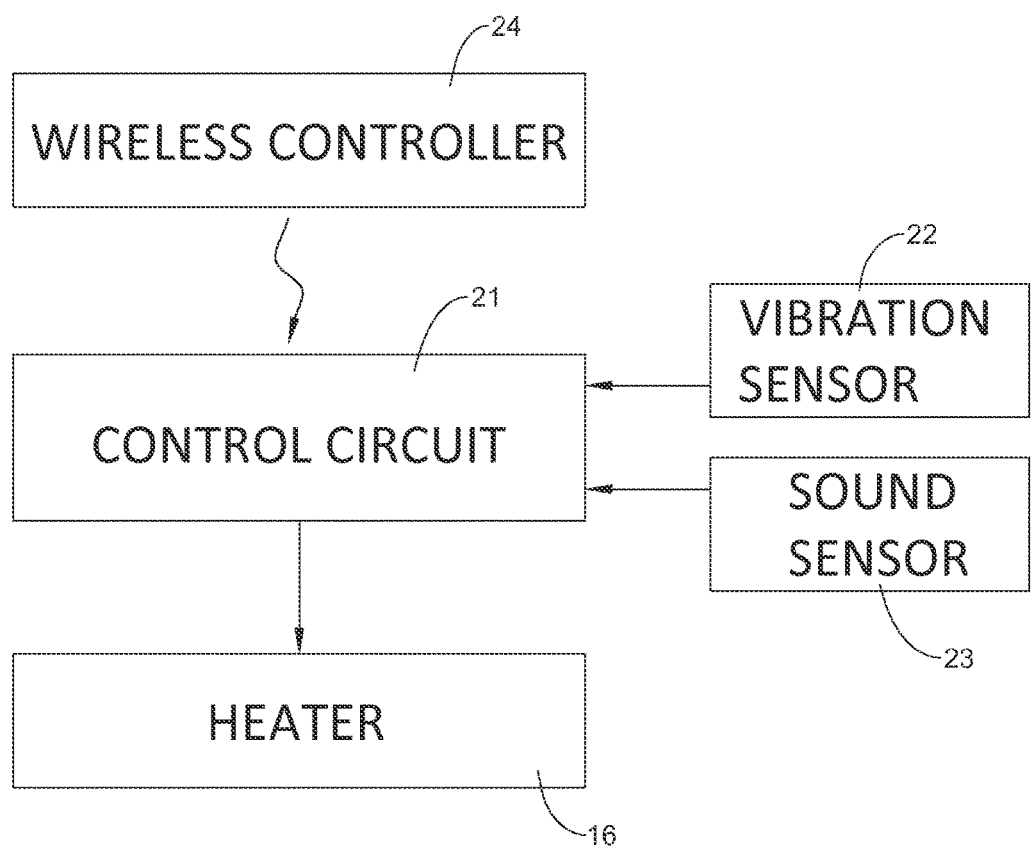
FIG. 4 is a functional diagram of the control unit of the apparatus in FIG. 1.

With reference to FIGS. 1 and 4, the control unit is connected electrically to and selectively actuates the heater 16 to heat the energy-saving activator in the main body 11. The control unit comprises a control circuit 21, a vibration sensor 22, a sound sensor 23 and an optional wireless controller 24. The control circuit 21 is connected electrically to and selectively actuates the heater 16 to heat the energy-saving activator. The control circuit 21 may be connected electrically to the heater 16 by a wire passing through the side tube 132 and the side passage 173. The vibration sensor 22 and the sound sensor 23 are connected electrically to the control circuit 21. The vibration sensor 22 may be mounted beside the control circuit 21 or mounted beside the internal combustion engine. The sound sensor 23 may be mounted beside the control circuit 21 or mounted beside a sound source. The vibration sensor 22 and the sound sensor 23 may be integrated as a whole. The wireless controller 24 outputs a wireless command signal to the control circuit 21.

Figure 5:
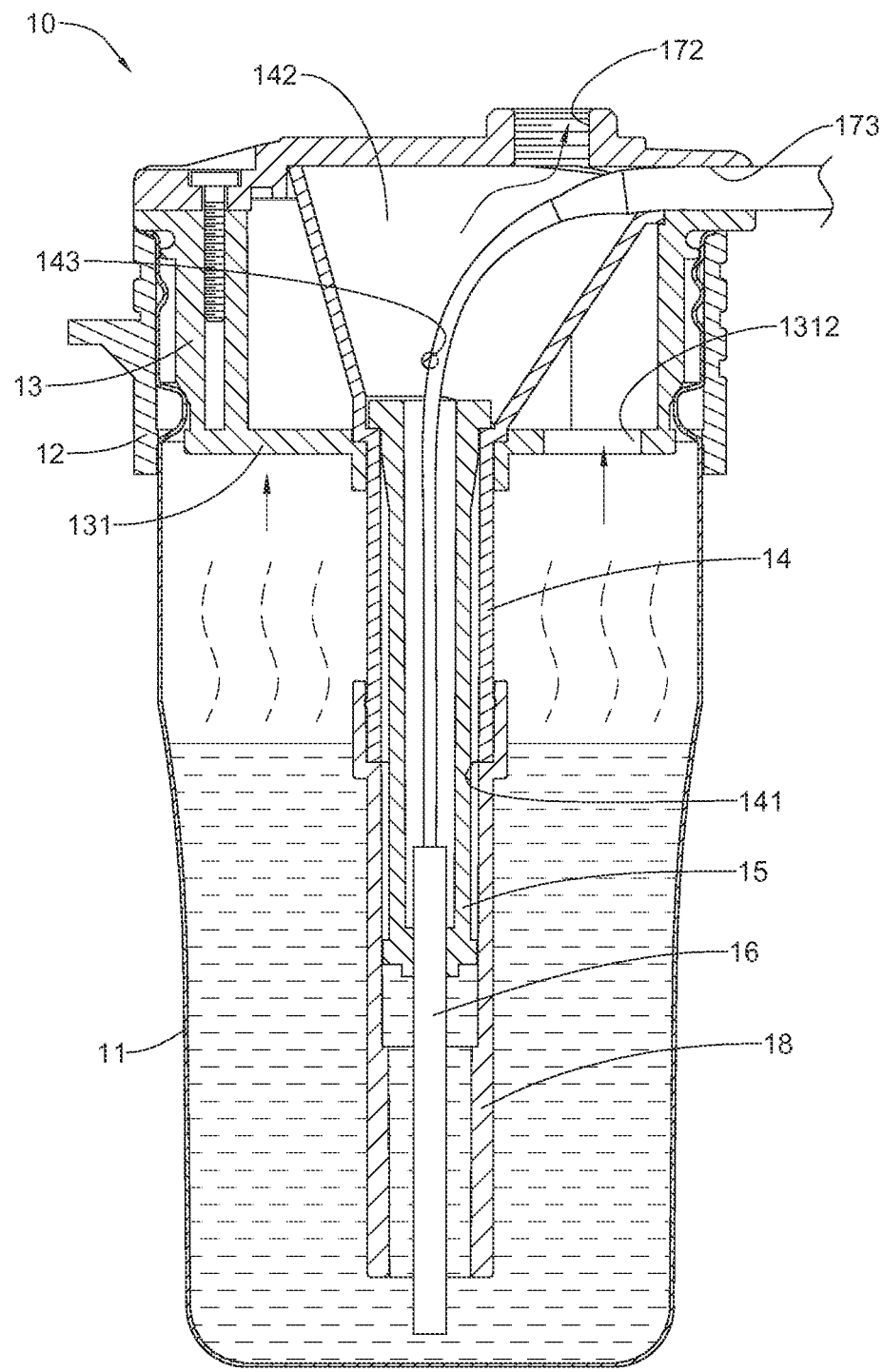
FIG. 5 is an operational side view in partial section of the container of the apparatus in FIG. 1.

With further reference to FIG. 5, when the heater 16 heats the energy-saving activator, the vapor has expanding volumes so that is forced to draft through the side holes 1312 of the bottom wall 131 of the inner sleeve 13. Then the vapor passes through the side orifice 143 into the top part of the funnel 14. Then the vapor drifts out of the top opening 142 of the funnel 14 and the vapor leaking hole 172 of the lid 17. A connecting tube is connected between the vapor leaking hole 172 of the lid 17 and the internal combustion engine so that the vapor flows into the internal combustion engine.

Figure 6:
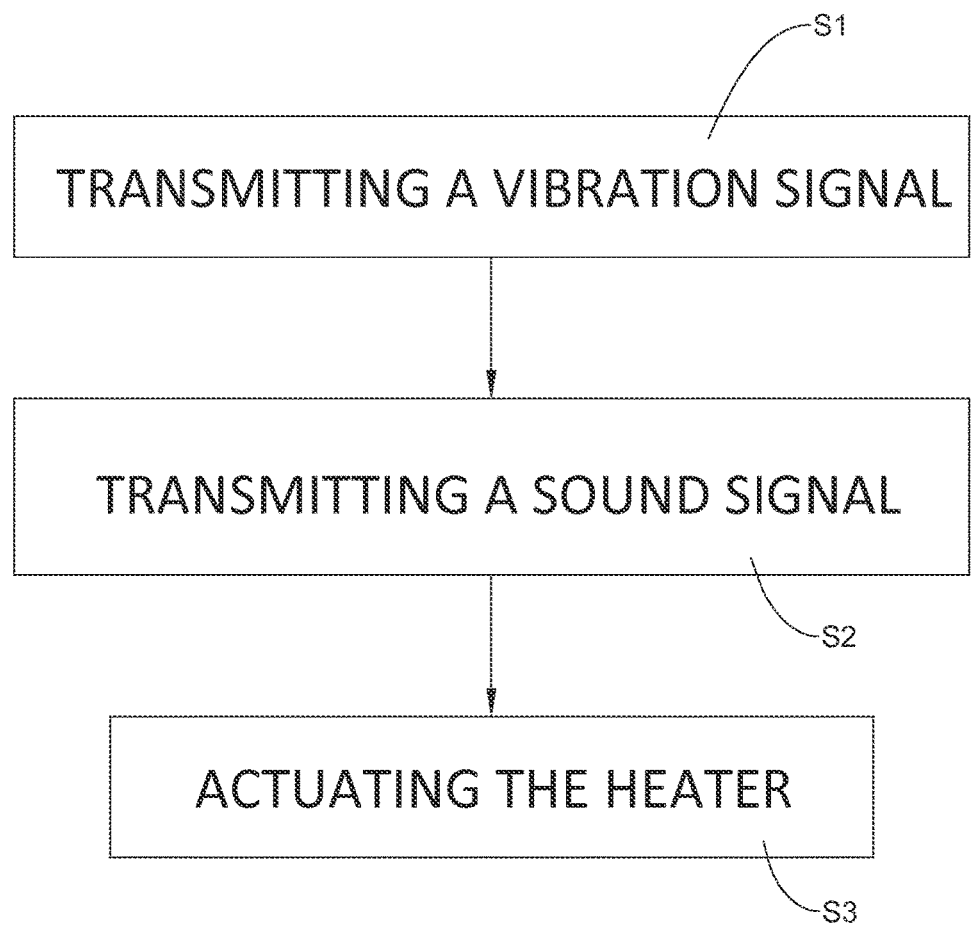
FIG. 6 is a flow chart of a method for auto-adding an energy-saving activator in accordance with the present invention.

With further reference to FIG. 6, a method for auto-adding an energy-saving activator in accordance with the present invention comprises following steps:

Transmitting a vibration signal (S1): The vibration sensor 22 receives a vibration signal from the internal combustion engine and sending the vibration signal to the control circuit 21.

Transmitting a sound signal (S2): The sound sensor 23 receives a sound signal from the internal combustion engine and sending the sound signal to the control circuit 21.

Determining actuating (S3): When the control circuit 21 receives both the vibration signal and the sound signal in a preset period, the control circuit 21 actuates the heater 16 to heat the energy-saving activator in the main body 11 so that the heated energy-saving activator turns into vapor and leaks out of the container 10 toward the internal combustion engine to decrease the carbon deposits. The vapor of the energy-saving activator may mix with the fuel in the internal combustion engine so that the fuel is burned oxyfuelly to enhance the burning efficiency of fuel to decrease the carbon deposits. The preset period may be a short time such as 0.5 second, 1 second, 2 seconds and so on to eliminate the time delay between the vibration and sound signals.

Using both vibration and sound sensors 22, 23 is in order to actuate the heater 16 correctly without erroneous judgment since both vibration and sound are occurred when the internal combustion engine is started. For example, if the internal combustion engine is accidentally bumped while its switched off, only the vibration signal is occurred so that the control circuit 21 does not actuate the heater 16. For another example, if the users make loud noises around the internal combustion engine while its switched off, only the sound signal is occurred so that the control circuit 21 does not actuate the heater 16.

Moreover, when the user needs to switch on the heater 16 as desired, the user may also use the wireless controller 24 to output a wireless command signal to the control circuit 21.

The method and apparatus of the present invention has following advantages. Using both the vibration and sound sensors is in order to actuate the heater 16 correctly without erroneous judgment. The heated vapor drafts into the internal combustion engine at once to mix with the fuel so that the fuel is burned oxyfuelly and completely to efficiently decrease the carbon deposits. Therefore, the efficiency of the internal combustion engine is enhanced without using more fuels. Moreover, the incomplete combustion is also reduced to avoid harmful objects.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An apparatus for auto-adding an energy-saving activator comprising:
    a container having
        a hollow main body having a top opening; and
        a heater mounted in the main body;
    a control unit electrically connected to the heater and having
        a control circuit electrically connected to and selectively actuating the heater;
        a vibration sensor electrically connected to the control circuit; and
        a sound sensor electrically connected to the control circuit,
    an inner sleeve plugged into the top opening of the main body and having
        a bottom wall having a central hole and multiple side holes; and
        a side tube formed on an outside wall of the inner sleeve and extending out of the top opening of the main body;
    a funnel mounted through the central hole of the inner sleeve in the main body and having
        a bottom opening;
        a top opening located above the top opening of the main body;
        a side orifice formed near the top opening of the funnel and located above the bottom wall of the inner sleeve; and
        a side opening formed adjacent to the top opening of the funnel and aligning with and communicating with the side tube of the inner sleeve a lid covered on the top opening of the main body and the top opening of the funnel, and having an activator filling hole communicating with the top opening of the main body;

a vapor leaking hole communicating with the top opening of the funnel; and a side passage formed through a sidewall of the lid and aligning with and communicating with the side tube of the inner sleeve; and a wire passing through the side tube of the inner sleeve, the side passage of the lid and the side opening of the funnel and connected between the control circuit and the heater;

wherein when the control circuit receives both a vibration signal from the vibration sensor and a sound signal from the sound sensor in a preset period, the control circuit actuates the heater.

2. The apparatus as claimed in claim 1 further comprising a connector detachably mounted on the activator filling hole of the lid.

3. The apparatus as claimed in claim 1 further comprising an outer sleeve mounted around the main body.

4. The apparatus as claimed in claim 1 further comprising tube mounted in the funnel.

5. The apparatus as claimed in claim 1 further comprising a remote controller outputting a wireless command signal to the control circuit.

6. The apparatus as claimed in claim 1, wherein a top part of the funnel is wider than a bottom part of the funnel.

7. The apparatus as claimed in claim 2, wherein a filter is connected to the connector of the activator filling hole of the lid.

8. The apparatus as claimed in claim 1 further comprising a connector detachably mounted on the vapor leaking hole of the lid.

* * * * *